Feb. 8, 1955   G. E. TENCH   2,701,542
PAN GREASING APPARATUS
Filed Aug. 7, 1950   8 Sheets-Sheet 1

INVENTOR
GEORGE E. TENCH
BY HIS ATTORNEYS
HARRIS, KIECH, FOSTER & HARRIS

Feb. 8, 1955  G. E. TENCH  2,701,542
PAN GREASING APPARATUS
Filed Aug. 7, 1950  8 Sheets-Sheet 2

INVENTOR
GEORGE E. TENCH
BY HIS ATTORNEYS
HARRIS, KIECH, FOSTER & HARRIS

Feb. 8, 1955　　　G. E. TENCH　　　2,701,542
PAN GREASING APPARATUS
Filed Aug. 7, 1950　　　8 Sheets-Sheet 5

INVENTOR
GEORGE E. TENCH
BY HIS ATTORNEYS
HARRIS, KIECH, FOSTER & HARRIS

United States Patent Office 2,701,542
Patented Feb. 8, 1955

2,701,542

PAN GREASING APPARATUS

George E. Tench, South Pasadena, Calif., assignor, by mesne assignments, to Read Standard Corporation, a corporation of Delaware Application August 7, 1950, Serial No. 178,134

28 Claims. (Cl. 118—2)

This invention relates to new and useful improvements in continuous duty automatic spraying equipment and deals more particularly with such apparatus for use in greasing the cavity of bread pans prior to the insertion of the dough to be baked.

Heretofore, bread pans have been greased manually, with manual aids, and with semiautomatic equipment that generally sprays the entire pan cavity. These procedures have become costly in manual labor, loss of time, and excessive use of grease and are unsuitable for present-day standards and demands of mass production of loaf bread.

It has been determined that the inner wall or walls and bottom surfaces of a bread pan need not be entirely sprayed with the grease to preclude adherence of the baked loaf to the pan, but it is sufficient to coat only a portion of the inner walls with a band of grease near the upper extremities thereof. This has resulted in a considerable saving in oil material and incidentally produces a product that is more appetizing in appearance due to the sparing amount of grease that is used, the band of grease applied still being sufficient to lubricate the pan walls.

The expansion of demands for bakery goods necessitates the application of mass production methods to their manufacture. At the present time, bread pans are not individually handled but are joined together by straps in any desired number and are commonly referred to as straps of pans. These integral units may be handled by a conveyor system and treated and loaded in sequence. It is an object of this invention to provide as one of these sequential operations an automatic greasing apparatus to apply a band of grease to the bread pans as they are progressively moved along the conveyor.

Briefly, the apparatus includes a belt to convey straps of pans, the pans passing beneath a movable grease distributor or nozzle whereby they are sprayed with grease in sequence. The nozzle is mounted upon a vertically movable carriage and is so actuated as to project a predetermined distance into the cavity of each pan as it passes, spray the pan with a band of grease, and then retract therefrom. The pan itself through actuating levers serves to initiate each of the above functions to accord proper timing as the pan passes the spraying station. It is, therefore, another object of this invention to provide a pan greasing apparatus that is actuated by the individual pans rendering the system entirely automatic.

It is another object to provide a carriage means to move the spray nozzle substantially into the cavity of each pan and withdraw the said nozzle after application of the spray.

Another object is to provide control means which includes a trigger mechanism operative to rapidly accelerate the spray nozzle carriage into operative position and to rapidly retract it therefrom.

Another object is to provide a nozzle with orifice characteristics suitable for applying a band of grease on the inner walls of the pan, said band being substantially uniform in width and quantity.

Another object is to provide adjustable means to control the amount of grease applied to each pan.

The invention also has for its objects to provide such means that are positive in operation, convenient in use, easily installed in working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 18 is a side elevational, sectional view of the nozzle unit as seen in Fig. 17;

Fig. 25 is a side elevational view of the actuator unit taken along the line 25—25 of Fig. 24;

Fig. 26 is an enlarged sectional view of the components comprising the clutch of the actuator unit shown in Fig. 24; and, Fig. 27 is an enlarged side elevational view, partially cut away, taken along the line 27—27 of Fig. 24 and showing the lever and release means for the actuator unit shown in Fig. 24.

The apparatus is entirely automatic, the individual pans by their movement along the conveyor belt serving to initiate and coordinate the operation. As the straps of pans approach the spraying station, a first control means or trip linkage mechanism, which includes two levers that extend in the path of the pan movement, is actuated as each pan passes thereby. The first control means is adapted to operate an air valve to provide air pressure to a cylinder that causes a hydraulic unit to slidably move downward toward the conveyor. Mounted on the hydraulic unit and integral therewith is a spray nozzle so disposed as to be projected into the cavity of the pan to be sprayed. When approaching the lowermost position, the hydraulic unit is actuated by a second control means which includes a trigger lever that engages with the upper rim of the pan and serves to release the grease from the nozzle to spray the inner walls of the pan. Progressive movement of the pan releases the first control means and permits the hydraulic unit to return to its uppermost and inoperative position as well as resets the mechanism for the next pan to be sprayed.

Figure 1:
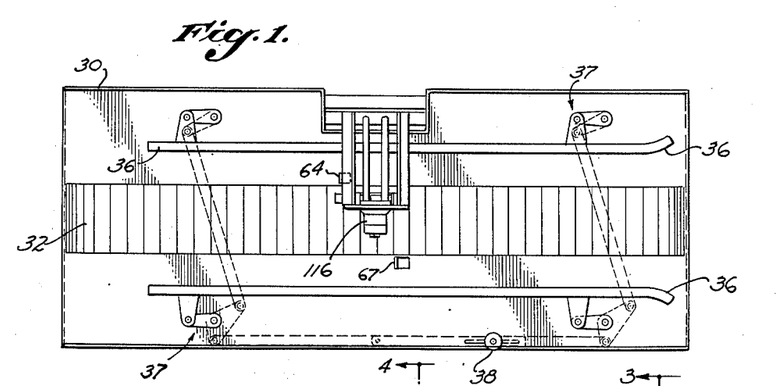
Fig. 1 is a plan view of the pan greasing apparatus showing the conveyor belt and relative position of the nozzle carriage.
Figure 2:
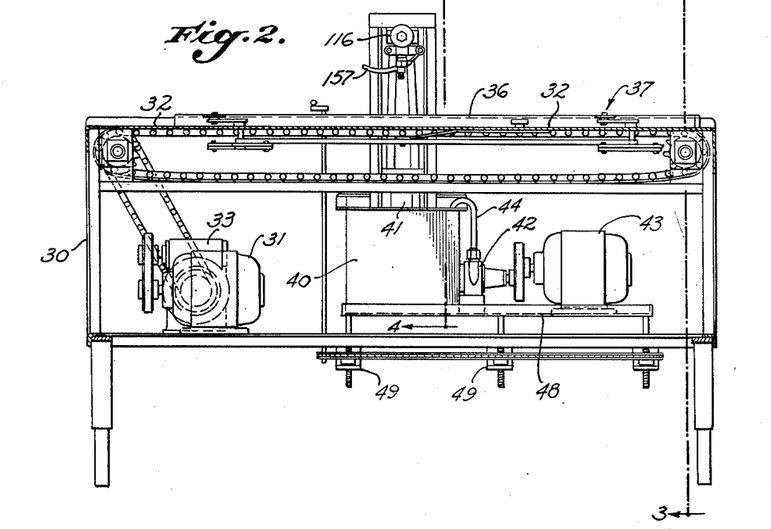
Fig. 2 is a side elevational view of the apparatus showing the driving components.
Figure 3:
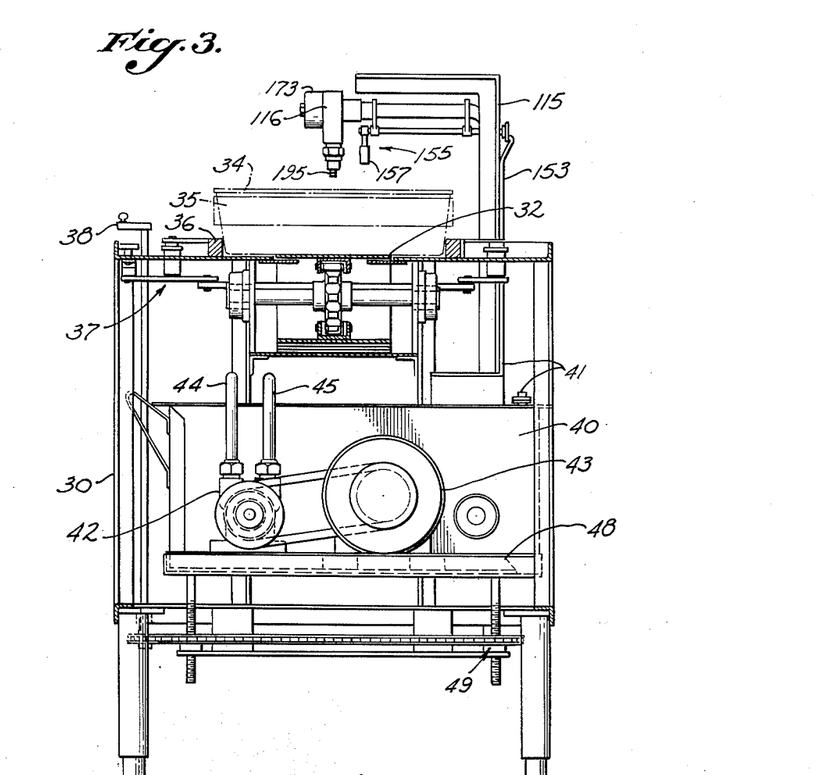
Fig. 3 is an enlarged end elevational view of apparatus taken along the line 3—3 of Fig. 2 and showing a strap of pans upon the conveyor belt.

Referring now to the drawings, Figs. 1, 2 and 3 generally indicate the relative positions of the apparatus components wherein a main frame 30 is shown to support a motor 31 which drives a pan feeding means, in the form of an endless conveyor belt 32, at a constant velocity through the medium of a speed reduction unit 33. The belt 32 is trained over suitable pulleys rotatably mounted at either end of the frame. The pans or receptacles 34 to be treated are directed onto the belt surface, for example from an adjacent conveyor as from the right side of Fig. 1, and are conveyed thereover. The pans are preferably handled in groups and are joined in spaced apart relation by a strap 35 forming what is commonly referred to as a strap of pans. The pans are guided along the conveyor path by means of a pair of rails 36 mounted on the top surface of the frame 30. A bell crank and linkage mechanism generally indicated by the reference numeral 37 provides a means to manually adjust the spaced apart distance of the rails 36 to accommodate various widths of straps of pans, such adjustment being made by a control knob 38.

Immediately below the belt 32 is mounted a tank or sump 40 which contains the reservoir of grease, and also movably mounted therewith is the hydraulic unit 41, the function and structure of which will be described hereinafter. A thermostat controlled heating element (not shown) is provided in the tank to maintain the grease at proper fluid temperature. A grease circulating pump 42 driven by a motor 43 is located adjacent the tank and serves to draw the fluid grease from the tank through a line 44 and force the grease through a line 45 to a strainer and relief valve 46 (see Fig. 4) and then to a flexible inlet line 47 to the hydraulic unit 41 whereby the said unit is continuously supplied with fluid grease under a predetermined pressure and temperature. The above-mentioned components are all conveniently supported by a frame 48 that is adjustable in elevation by means of a chain-driven lead-screw arrangement as indicated generally by the numeral 49.

Figures 6, 7:
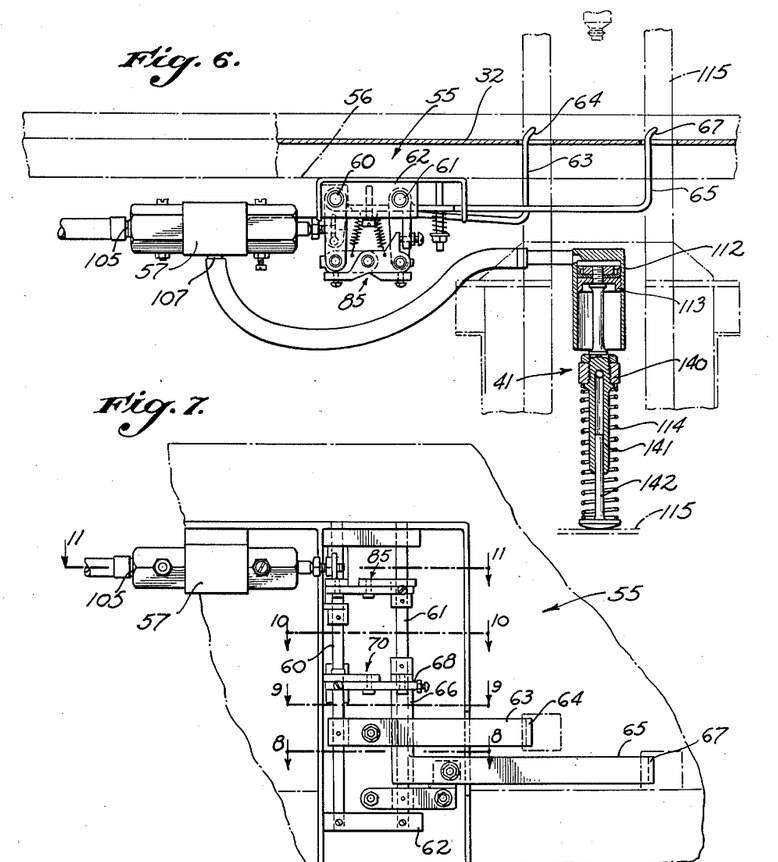
Fig. 6 is an enlarged side elevational view, partially in section, of the actuator unit showing the component parts thereof and its operative position with respect to the air valve and air plunger unit.
Fig. 7 is a bottom view of the actuator unit shown in Fig. 6.
Figure 8:
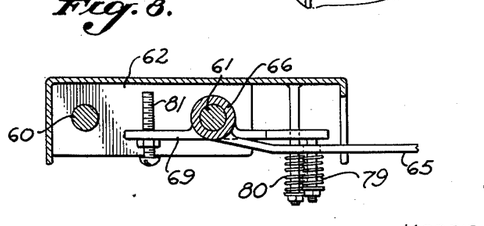
Figs. 8, 9 and 10 are enlarged, side elevational, sectional views of the actuator unit taken along the lines 8—8, 9—9 and 10—10, respectively, of Fig. 7.
Figure 9:
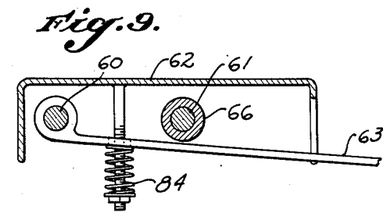
Figure 10:
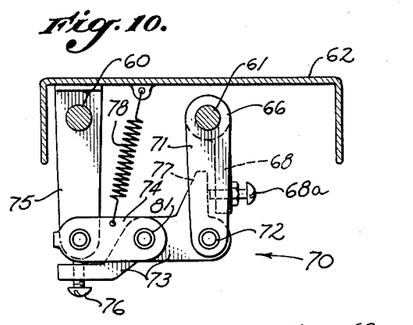

Due to the high conveyor belt velocities desired in quantity production of bread, it is mandatory that the nozzle have rapid acceleration into and out of the spray position. This is accomplished by means of an operating means and a first control means or actuator unit therefor, the components of which are seen in Figs. 6 to 11, inclusive. First referring to Fig. 6, the actuator unit is generally indicated by the numeral 55 and is rigidly attached to the under side of a frame table 56. An air valve 57 is mounted adjacent the actuator and operatively associated therewith, the actuator 55 functioning to create a rapid and positive motion to operate the air valve 57. The actuator comprises two parallel and freely rotatable shafts 60 and 61 that are longitudinally secured at their ends to a channel frame and brackets 62. A first lever 63 is rigidly pinned to the shaft 60 and extends upward of the channel frame 62 and through a port in the frame table 56. The lever 63 is provided with an inclined tip 64 for engagement with the leading edge of each pan, the lever also being spring loaded by a compression spring 84 (Fig. 9) to assure proper return to the normal position. A second lever 65 is mounted on the shaft 61 and freely pivotal thereabout by means of an elongated sleeve 66 (Fig. 8) and extends in a similar manner, but in greater length, from the channel frame 62 through a port in the frame table 56. It is similarly provided with an inclined tip 67 for engagement with a pan. The second lever 65 is spring-coupled to the shaft 61 by means of a stop bar 69, as best seen in Fig. 8, the bar of which is pinned to the shaft 61. A compression spring 79 serves to transmit the torque of the second lever 65 to the shaft 61, and a second compression spring 80 absorbs any over-travel of the lever when the bar 69 is limited in rotation by an adjustable screw 81 engaging the channel frame 62. A finger 68 depends from the sleeve 66 and extends into engagement with a link mechanism 70 (Figs. 7 and 10).

Thus, as the pan traverses the table 56, the leading edge or side of the pan will depress the first lever 63 and then the second lever 65. Progressive movement of the pan will release the first lever 63 and then the second lever 65. As the first lever is depressed, the shaft 60 has imparted to it a slight rotational movement, the function of which will appear hereinafter. Depressing the second lever functions to trip the link mechanism 70.

The link mechanism 70, as best seen in Fig. 10, comprises a pendulous arm 71 that is rigidly affixed at its upper end to the shaft 61 and pivotally attached at the other end to a pin 72, the said pin being capable of limited circumferential motion about the axis of the shaft 61. Also pivotally connected to the pin 72 is a trip latch arm 73 having an angled configuration, the said latch arm being pivotally jointed intermediate its ends by a pin 81 to a link 74, the said link in turn being pivotally joined to a bracket 75. The end of the latch arm adjacent the bracket 75 has an adjustable screw 76 that abuts with the bracket, and the other end of the latch has an appendage 77 that abuts with the screw 68a when the mechanism is in the normal position. A tension spring 78 is connected between the frame 62 and the link 74 and maintains the linkage in the normal position as shown with the pivotal centers in substantially the same plane rendering the link 74 and the latch 73 in rigid relation. However, when the finger 68 is angularly moved toward the appendage 77 the alignment of the pivotal centers is disturbed, causing the linkage to rapidly break through about the pin 81, thus imparting a rapid, clockwise motion to the shaft 61 as indicated by the arrow in Fig. 10. This quick motion is utilized to actuate the air valve 57 through the medium of a further link mechanism 85.

Figure 11:
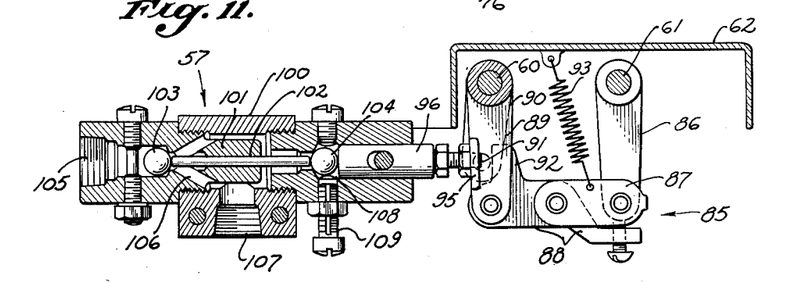
Fig. 11 is an enlarged, side elevational view of the actuator unit taken along the line 11—11 of Fig. 7 and showing the operative relationship of the air valve unit and the actuator unit.
Figure 12:
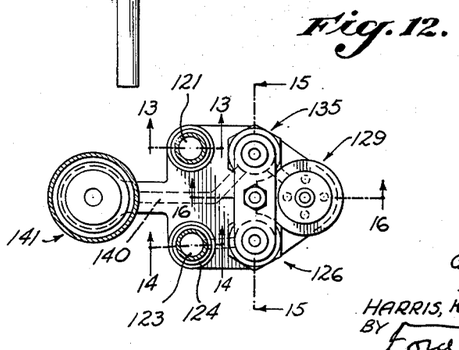
Fig. 12 is a sectional plan view of the hydraulic unit taken along the line 12—12 of Fig. 4.
Figures 13, 14, 15, 16:
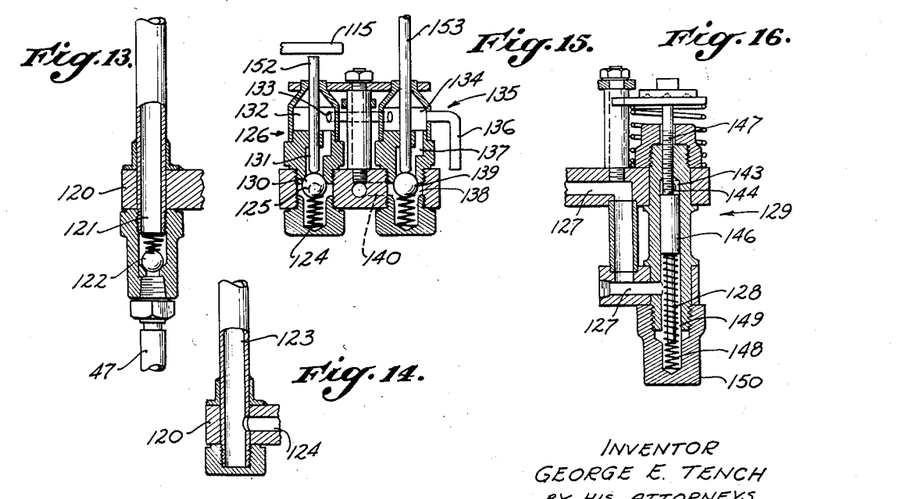
Figs. 13, 14, 15 and 16 are sectional, elevational views taken along the lines 13—13, 14—14, 15—15 and 16—16, respectively, of Fig. 12.
Figure 16:
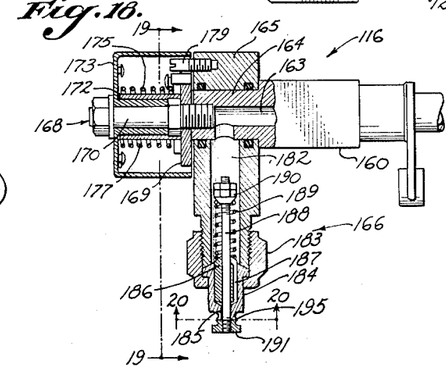
Figure 17:
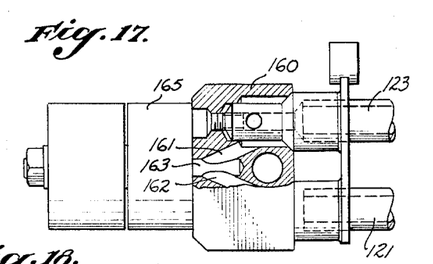
Fig. 17 is an enlarged top view, partially in section, of the nozzle unit taken along the line 17—17 of Fig. 4.
Figure 19:
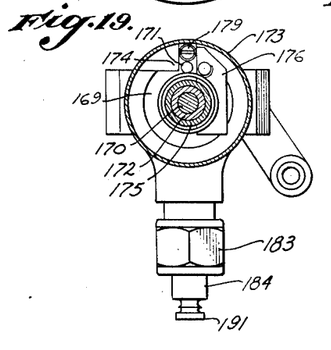
Fig. 19 is a front elevational view of the nozzle unit taken along the line 19—19 of Fig. 18.

The link mechanism 85 and the air valve 57 are best seen in Fig. 11, the said mechanism 85 being somewhat similar to the link mechanism 70 with the components in reverse order. A pendulous arm 86 is rigidly affixed at one end to the shaft 61 and pivotally connected at its other end to a link 87, the said link in turn being pivotally connected to a trip latch arm 88. However, the arm 88 is pivotally connected to an arm 89, the arm 89 being freely pivotal at its other end about the shaft 60. Rigid with the shaft 60 is a crank 90 that has an offset stud 91 for engagement with an appendage 92 of the latch arm 88. A tension spring 93 yieldably retains the link mechanism 85 in normal latch position similar to the link mechanism 70. The link mechanism 85 is associated with the air valve 57 by means of a boss 95 of the arm 89 which abuts with the end of a valve piston 96.

The operation of the actuator unit is as follows. As the leading edge of the pan depresses the first lever 63, the crank 90 is moved through the medium of the shaft 60 to withdraw the stud 91 from proximity with the trip latch arm 88, thus setting the actuator for subsequent action. When the second lever 65 is depressed the finger 68 is displaced to trigger the link mechanism 70 thereby imparting a rapid rotational motion to the shaft 61. This rotation is transmitted through the link mechanism 85 with the link 87 and the trip latch arm 88 in rigid interlock to move the arm 89 in such direction as to drive the piston 96 and open the air valve 57 with rapid acceleration. As the pan progresses the first lever 63 is released whereby the stud 91 engages the appendage 92 of the latch arm 88 to trigger the link mechanism 85 and thereby permits the air valve to close with rapid acceleration. Release of the second lever displaces the finger 68 and permits the springs 78 and 93 to reset the link mechanisms 70 and 85 in their normal latched positions. Thus the air valve 57 is actuated and released with a positive and rapid action which is mandatory for proper operation of the hydraulic unit 41.

Figure 22:
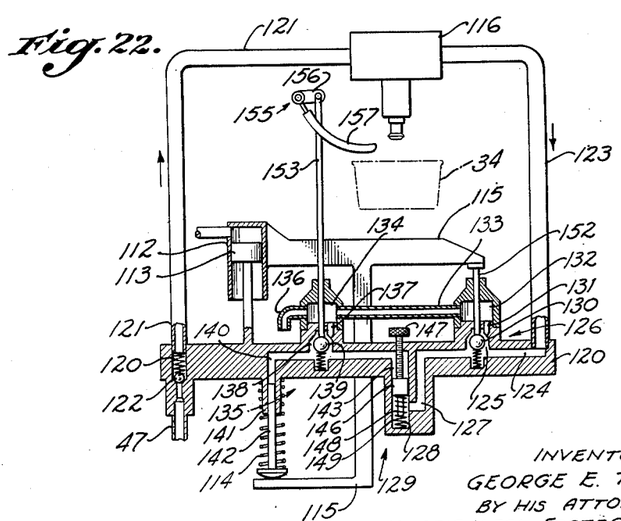
Fig. 22 is a schematic representation of the details of the hydraulic unit.

Fig. 11 shows the air valve 57 which comprises a composite body 100 and a valve 101 slidable in said body. The valve has a stem 102 and includes spheres 103 and 104 at either extremity thereof and is reciprocally slidable to alternately urge the said spheres into sealed engagement with their valve seats provided by the body. A source of air pressure is connected to an inlet 105 which normally forces the sphere 103 into its seat and prevents the air flow from entering a chamber 106 within the body 100. When the valve 101 is moved, as by the force of the piston 96 driving the sphere 104 into its seat, the inlet 105 is communicated with the chamber 106, thus permitting the air pressure to be applied to a hose (not shown) connected to an outlet 107. Release of the force on the piston 96 allows the air pressure to drive the sphere 103 into its seat and simultaneously unseat the sphere 104 thereby communicating the chamber 106 with an adjustable exhaust port 108 to atmosphere. A center-bored screw 109 is the adjustable means and is moved in or out depending upon the rapidity of exhaust desired, the rapidity of the exhaust controlling the return stroke of the hydraulic unit by release of air from cylinder 112, Figs. 4 and 22.

The outlet 107 is connected to an air cylinder 112, as seen in Fig. 6, whereby a piston 113 therein will depress under admitted air pressure against restraint of a compression spring 114. Release of the air to atmosphere at the air valve 57 will permit the spring 114 to drive the piston into its uppermost position. The air cylinder 112 is a part of the hydraulic unit 41 and initiates the movement thereof.

Figures 4, 5:
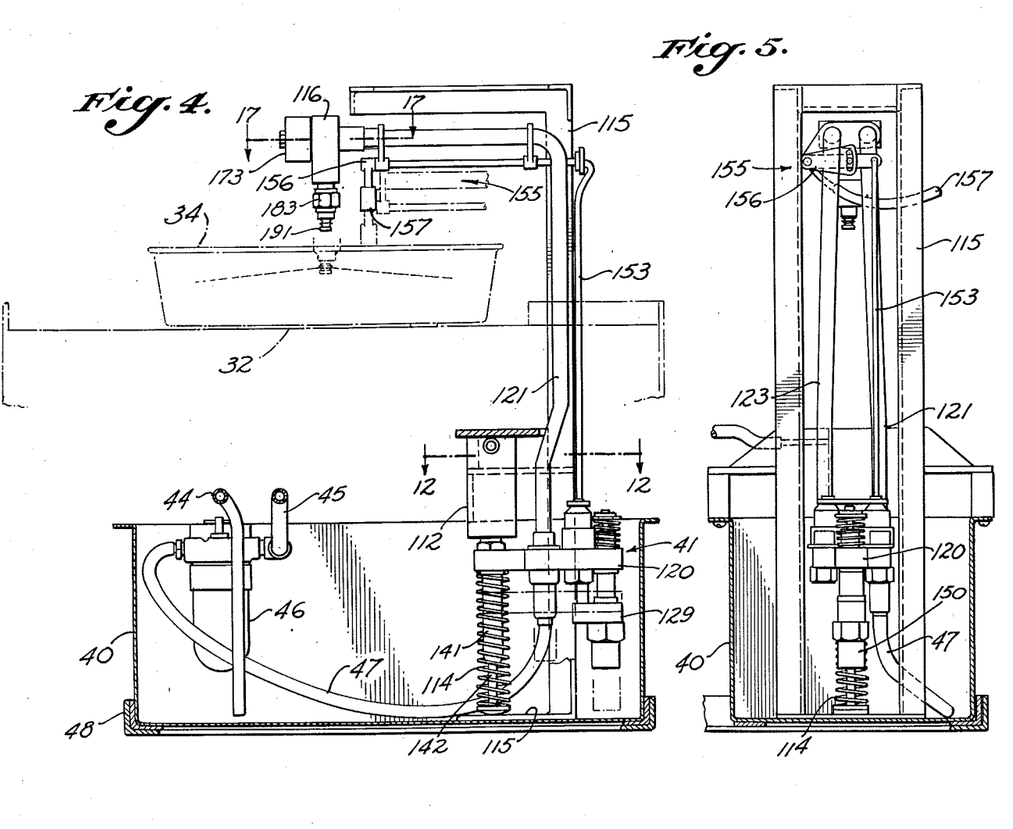
Fig. 4 is an enlarged side elevational view of the hydraulic unit taken along the line 4—4 of Fig. 2 and showing the nozzle carriage in its normal position and also showing the operative position in phantom.
Fig. 5 is an end elevational view of the hydraulic unit as seen in Fig. 4.

The hydraulic unit 41 is supported by and integral with the piston 113, both being vertically movable with respect to an overhead frame 115 and the air cylinder 112 attached thereto, as seen in Fig. 4. The lower extremity of the unit is disposed within the grease tank 40 and extends upwardly and angularly outward and terminates at a nozzle unit 116 at a position directly over the conveyor belt 32. When the air cylinder 112 is supplied with pressure, the unit 41 will move downward, thus depressing the nozzle unit 116 into the cavity of the pan 34 as indicated in phantom.

As hereinbefore indicated, the grease is applied under regulated pressure through the inlet line 47 to the hydraulic unit 41. For purposes of clarity the hydraulic unit is shown schematically in Fig. 22, the details thereof being shown in Figs. 12 through 20.

Referring to the schematic view and with incidental reference to the details, the hydraulic unit comprises a composite body 120 of interconnected fluid passages and fluid lines and is vertically movable in its entirety with respect to the frame 115, the normal and inoperative position thereof being up as shown. The grease inlet line 47 connects to the body 120 (see Fig. 13) and to a line 121 having a ball check valve 122 therein. The line 121 extends upward to and through the nozzle unit 116 to a line 123 which extends downward and into the body 120 (see Figs. 5 and 14) and a passage 124 to a chamber 125 having a circulation check unit 126 (see Fig. 15). A passage 127 (Fig. 16) is in continuous connection with the chamber 125 and communicates it with a lower chamber 128 of a metering cylinder 129. The chamber 125 houses a circulation ball check valve 130 which is normally open and permits a flow of grease through a passage 131, an antechamber 132, and a passage 133, into an antechamber 134 of a depth check unit 135, and then through an exhaust passage 136 discharging the grease to the tank 40. Thus, there is provided an unimpeded circulation path for the heated grease whereby the hydraulic unit 41 may be maintained warm as well as permitting any air that may have found its way into the line to be bled therefrom.

The antechamber 134 is connected through a passage 137 to a chamber 138 that houses a depth ball check valve 139 which is normally open to communicate the supply of grease through a passage 140 to a hydraulic cylinder 141 (see Fig. 6) which has a plunger 142 slidable therein and is in firm spring-loaded abutment with the frame 115. The chamber 138 is also connected to an upper chamber 143 (see Fig. 16) of the metering cylinder 129 by means of a passage 144.

Intermediate and separating the chambers 128 and 143 of the metering cylinder 129 is a freely slidable plunger 146 that is normally urged into contact with an adjustable screw 147 by a compression spring 148 which thereby determines the height of the plunger within the cylinder. The plunger 146 is provided with a stem 149 extending into the lower chamber 128 and is of such length that when depressed into engagement with a cap 150 the plunger will not block the passage 127.

The circulation check device 126 is provided with a slidable rod 152 (see Fig. 15) that operatively associates the frame 115 with the circulation ball check valve 130 by depressing said ball when the hydraulic unit is in the uppermost and inoperative position. The depth check unit 135 is provided with a slidable rod 153 (see Figs. 15, 4 and 5) that operatively associates the upper rim of the pan 34 with the depth ball check valve 139 when the hydraulic unit is in the lower and operative position. The rod 153 forms a part of a second control means or trigger linkage generally indicated by the numeral 155 (Fig. 5) and includes a bell crank 156 and an arcuate finger 157 for contacting the pan rim which are pivoted to the hydraulic unit structure to displace the rod 153. A preferred construction herein is to provide a predetermined amount of lost motion between the bell crank 156 and the rod 153 by means of a stud and slot to prevent the torque of the bell crank 156 and finger 157 when released from appearing as an increased force on the ball check valve 139.

The nozzle unit 116 is shown in Figs. 17 to 20, and 20a, being a component of the hydraulic unit 41, and moves in concert therewith to depress the grease emitting extremity into the cavity of the pan. As hereinbefore indicated, the grease is circulated through the nozzle unit by means of the lines 121 and 123. These lines are connected into a stationary body 160 having symmetrical passages 161 and 162 therein connected by a center passage 163 that also extends axially through a cylindrical extension 164 of the said body 160. Slidably receivable over the said extension 164 and pivoted thereto is a housing 165 that contains the nozzle valve as generally indicated by the numeral 166. The housing 165 is normally restrained in a substantially vertical position by spring loading but is rendered pivotal to prevent damage in the event of inadvertent disturbance of the synchronism of the system. Thus, if a moving pan strikes the side of the housing, it is free to pivot to preclude breakage thereof.

The spring loading unit generally indicated by the numeral 168, includes a plate 169 and a partially threaded shaft 170 that is firmly mounted in the extension 164, the plate 169 having an eccentric stop stud 171 extending therefrom for centrally locating the housing 165. A central tube 172 of a cap 173 is axially pivotal about the shaft 170, the cap having a boss 174 for engagement with the stud 171. Pivotal about the tube 172 is a sleeve 175 which has a depending finger 176 for engagement with the stud 171 on the opposite side thereof. A torsion spring 177 is coiled about the sleeve 175 being secured at one end to the finger 176 and at the other end to the cap 173.

The housing 165 is provided with a pin 179 that is eccentric to the housing axis and extends between the boss 174 and the finger 176 and is normally restrained therebetween to maintain the nozzle valve in position. In the event, however, that the housing 165 is pivotally displaced, for example, in a clockwise direction as viewed in Fig. 19, the pin 179 will angularly displace the finger 176 from its normal position as shown and thereby increase the torsion on the spring 177, as the opposite extremity of the spring is fixed to the cap 173, which remains stationary in contact with the stud 171. A counterclockwise displacement of the housing will displace the cap 173 by means of the boss 174 and similarly increase the spring torsion for the other extremity of the spring is fixed to the finger 176 that remains stationary. Thus the housing is centered by spring loading in both directions.

The center passage 163 of the extension 164 is in continuous communication with a cylindrical chamber 182 of the housing 165, the chamber at its other extremity being normally impeded by a spring-loaded poppet-type valve retained therein by a cap 183. The valve includes a cylindrical nozzle 184 having a large bore partially therethrough terminating at a central orifice 185 (Fig. 20a), the nozzle being rigidly fixed in alignment with the axis of the chamber 182. Disposed within the confines of the bore of the nozzle 184 is an insert 186 having a plurality of longitudinal slots 187 the length of the insert to communicate the chamber 182 with the orifice 185. The insert is provided with a central bore to accommodate a shaft 188 that is slidable therein but normally restrained in an upward position by means of a compression spring 189 about the shaft and intermediate the insert 186 and a shaft nut 190. Fixed to the lower extremity of the shaft 188 is an annular deflector tip 191 that is adapted to engage the orifice face of the nozzle 184, the contacting surfaces of which are preferably lapped to render a positive seal. Thus when the pressure of the grease within the chamber 182 attains a predetermined value, the shaft 188 will move downward and permit the grease to be exhausted through the slots 187, thence through the orifice 185 and to atmosphere between the surfaces of the nozzle and tip.

Figure 20:
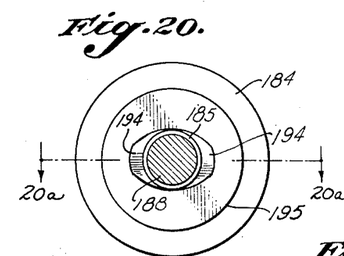
Fig. 20 is an enlarged, sectional bottom view of the nozzle taken along the line 20—20 of Fig. 18.
Figure 20A:
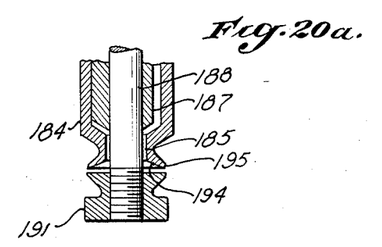
Fig. 20a is an enlarged cross-sectional view of the discharge end of the nozzle, taken on line 20a—20a of Fig. 20.
Figure 21:
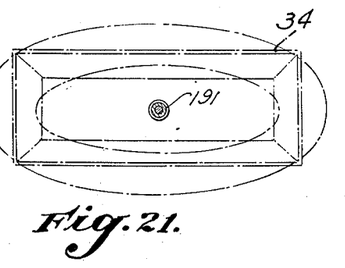
Fig. 21 is a top view of a pan showing the grease concentration area after being sprayed.

Due to the rectangular shape of the pan it has been found desirable to shape the base of the nozzle orifice in order to assure substantially equal deposits of grease upon the inner walls of the pan. Fig. 20 shows an exemplary form, greatly enlarged, of an orifice to produce a grease spray represented in Fig. 21. It is contemplated that the said orifice may be so contoured to satisfy the requirements of differently dimensioned pans. It is also contemplated that the engaging face of the deflector tip 191 may be contoured to define a predetermined spray pattern. In the represented form, the face of the nozzle 184 is angularly depressed toward and adjacent the orifice 185 along a diameter thereof to form two symmetrically disposed and concave curvilinear surfaces 194 which constitute a major axis of the orifice. The minor axis may or may not be similarly shaped to a lesser extent as required. When the tip 191 is displaced from its normal position, the grease is free to pass to atmosphere under pressure, but due to the shape of the face of the orifice, the major axis has a greater volumetric capacity and greater velocity coefficient. The said capacity and coefficient progressively decrease toward the minor axis. Since the exhaust area is constant between the tip and nozzle peripheries, the grease velocity along the major axis will be comparatively large and progressively decrease toward the minor axis. The grease particles are thus expelled at differential velocities and are directed to be applied in substantially equal quantity upon the inner walls of the pan.

In the absence of further modification, the spray so attained approaches a horizontal line which may be suitable for certain applications. However, in the illustrated embodiment it is desirable to obtain a band of grease of predetermined thickness. Such may be accomplished by providing an acute bevel 195 around the outer periphery of the nozzle base to reduce the eddy losses thereat and effectively alter the direction of flow without materially affecting the velocity. In this manner the grease may be spread to a desired width at the point of interception with the pan walls. It also may be desirable to bevel the peripheral edge of the nozzle to similarly alter the course of the flow of grease. Depending upon the structure desired, the band of grease may be directed above or below the horizontal plane of engagement of the nozzle and tip.

The operation of the hydraulic unit 41 is as follows. When an individual pan reaches a predetermined position upon the frame table 56, the actuator unit 55 operates to open the air valve 57 and admit air pressure into the air cylinder 112. The hydraulic unit 41 is thereby caused to move downward and simultaneously close the circulation check unit 126, thus trapping a portion of the grease between the plunger 146 of the metering cylinder 129 and the ball check valve 122 adjacent the inlet line 47. As the downward motion progresses the plunger 142 of the hydraulic cylinder 121, being in firm abutment with the frame 115, urges the grease out of the passage 140, through the normally open depth check unit 135, to the antechamber 134 and thence to the tank 40 via the passage 136. When the trigger linkage 155 is actuated by the upper rim of the pan, the depth check unit 135 closes, thereby causing the grease to exert force upon the plunger 146 of the metering cylinder to drive the plunger to its lowermost position as limited by engagement of the stem 149 and the cap 150. The plunger 146, in its downward movement, causes increased pressure upon the grease trapped in the passages on the other side thereof, the flow of which is only releasable through the nozzle unit 116. The increased pressure appears within the chamber 182 of the nozzle unit and urges the nozzle valve to open against the restraint of the compression spring 189 whereby the grease is exhausted through the orifice to spray the inner walls of the pan.

The quantity of grease that is emitted from the nozzle is determined by the initial position of the plunger 146 of the metering cylinder. If a lesser amount is desired, the screw 147 is manually adjusted to locate the plunger in a lower initial position. The lower limit of travel of the hydraulic unit 41 is a variable, depending upon the initial position of the plunger 146, for no exhaust is provided for the grease between the plungers 142 and 146. This is not undesirable for the minute compressibility of the grease confined serves as a shock absorber for the rapidly moving unit carriage.

The hydraulic unit 41 remains at the lower limit until the air pressure in the cylinder 112 is released through the air valve 57, whereupon the compression spring 114, in addition to other springs that may be utilized, urges the unit to the uppermost position, during which time the circulation check unit 126 and the pan depth check unit 135 will open to permit the passages and chambers to be replenished with grease for the next sequential cycle.

Figure 23:
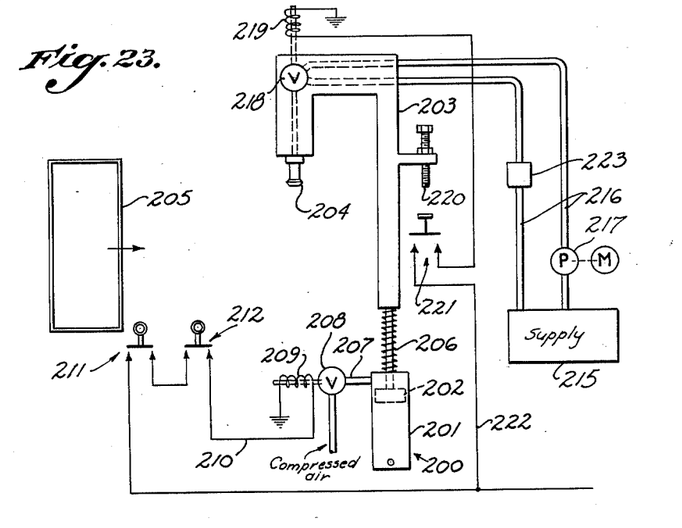
Fig. 23 is a schematic view of a modified control system for the apparatus.

Referring now to Fig. 23, the present invention also contemplates the provision of an electric control by which the nozzle positioning means and the grease spraying means are operated in proper sequence. The alternative control includes a pneumatic actuator 200 comprising a stationary cylinder 201 and a piston 202 slidable in the cylinder, the piston being operatively connected to the slidable frame 203 which corresponds to the hydraulic unit 41 described previously in connection with the embodiment illustrated in Figs. 1 to 22. The frame 203 normally is maintained in elevated position with its nozzle 204 above the path of movement of the bakery pans 205 by spring means 206 but when compressed air is introduced into the cylinder 201 through a line 207 the frame 203 is drawn downwardly to dispose the nozzle within a pan 205. The pneumatic line 207 is normally closed by a valve 208 which is of the solenoid-actuated type.

The solenoid 209 of the valve 208 is connected in an electrical circuit 210 which includes a normally open switch 211 and a normally open switch 212. These switches are connected in series and their actuators are disposed in and spaced along the path of movement of the bread pans 205 so as to be engaged by the latter. Thus, as a pan 205 is fed forwardly, its leading edge first engages and closes the switch 211 and as the pan continues its forward motion and the approximate center of the pan is aligned with the nozzle 204, the switch 212 is closed by the pan. When the circuit 210 is thus completed, the solenoid 209 is energized to open the air valve 208 so that the piston 202, together with the frame 203, is slid downwardly to dispose the nozzle 204 within the pan in readiness to perform a spraying operation.

The grease to be sprayed onto the interior surfaces of the pan 205 is supplied to the nozzle 204 from a supply tank 215 and a line 216 through which the heated grease is normally circulated by a motor driven pump 217. Disposed in the line 216 is a valve 218 through which the grease is normally circulated. When the valve 218 is actuated by a solenoid 219, return of the grease to the supply tank 215 is checked and the grease is caused to flow through the nozzle 204. The solenoid 219 is energized in response to a predetermined downward movement of the frame 203; that is, in response to arrival of the nozzle 204 to a point within the pan 205. While the means for energizing the solenoid 219 may be of any type suitable for the purpose, Fig. 23 shows a more or less conventional switch means for accomplishing the desired result. The frame 203 may carry an adjustable abutment 220 which is adapted to engage the actuator of a switch 221 as the frame and nozzle approach a predetermined position, the switch being connected in series with the solenoid in a circuit 222.

It will be apparent that when the nozzle enters the pan 205 the abutment 220 closes the switch 221 to energize the solenoid 219 which functions to operate the valve 218 so as to direct the flow of grease through the nozzle 204 to effect the spraying operation. Following this action, the pan 205 disengages the actuator of the switch 211 to allow the latter to open and thus de-energize the solenoid 209 to disrupt the flow of air to the cylinder 201. The spring 206 then acts to return frame 203 and nozzle 204 to uppermost position and at the initial upward movement thereof the switch 221 is opened to de-energize the solenoid 219 and thus restore the valve to its normal setting to allow circulation of the grease through the line 216.

As will be readily apparent, the circuit closing means 211, 212 and 221 may be mercury type switches to avoid arcing and thus eliminate fire hazard, and in another embodiment these means may be photoelectric cell units.

As in the main embodiment of the invention, metering means 223 may be provided for forcing a predetermined amount of grease through the nozzle 204 in which case the switch 221 would close a circuit to an electric means for actuating said metering means.

Figure 24:
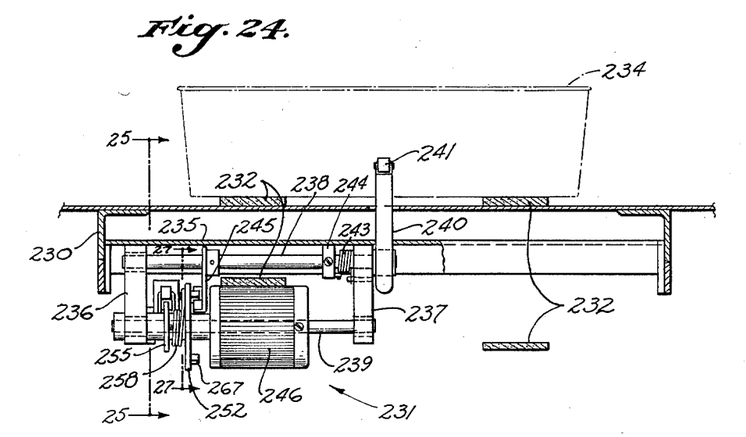
Fig. 24 is a side elevational view of another form of an actuator unit that may be used in the present invention.
Figures 25, 26, 27:
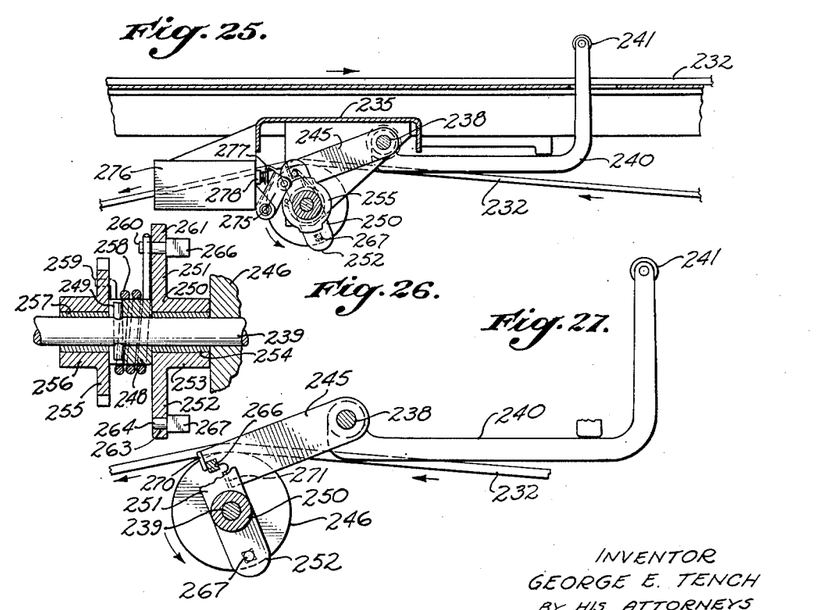

Figs. 24 and 25 are side elevational views of a modified actuator that may be substituted for the actuator unit 55 as seen in Figs. 6 and 7. In this embodiment the sequence of operation is initiated by a single control lever rather than the dual control hereinbefore described in connection with Figs. 6 and 7.

Referring now to Fig. 24, a main frame 230 is the supporting member for an actuator unit generally indicated by the numeral 231 and for a double endless conveyor belt 232 that conveys a pan 234 or a plurality thereof across the frame. A channel member 235 is rigidly attached to the main frame 230 having two pillow blocks 236 and 237 extending therefrom for support of two rotatable shafts 238 and 239. A lever 240 having an upwardly extending portion terminating at a roller bearing 241 for engagement with the pan 234 is rigidly affixed to the shaft 238. About the shaft 238 is a coil spring 243 having its extremities respectively connected to the block 237 and to a collar 244 that is rigidly affixed to the shaft to maintain the lever 240 in a normal uppermost position in the path of the conveyed pans. Rigidly connected to the shaft 238 and rotatable therewith is a pawl 245 that extends toward the shaft 239 for operative relation with the components thereof as will hereinafter be described.

The shaft 239 is provided with a drum 246 having a corrugated peripheral surface for frictional engagement with the return side of one of the conveyor belts 232 whereby the drum is rotated in a direction indicated by the arrow commensurate with the velocity of the belt. Referring to Fig. 26, the shaft 239 is also provided with an annular collar 248 concentric with the axis of the shaft and is permanently integrated therewith by means of a pin 249. Intermediate the drum 246 and the collar 248 is a pin carrier 250 having oppositely extending legs 251 and 252 formed integrally with a hub 253, the shaft being freely rotatable with respect to the pin carrier through the medium of a sleeve bearing 254. Similarly mounted upon the shaft 239 on the other side of the collar 248 is a cam 255 having two symmetrical cam surfaces and is formed integrally with a hub 256, the shaft being freely rotatable with respect to the cam through the medium of a sleeve bearing 257. Coiled about the collar 248 is a torsion spring 258 having one or a plurality of turns. One extremity of the spring is firmly engaged with the cam 255 as by extending through an aperture 259 therein, and the opposite extremity is releasably engageable with the pin carrier 250 by means of a shank 260 of a stud 261 that is pressed into and extends through the leg 251 of the carrier. The spring 258 is designed in a manner that when normally unrestrained the coil or coils thereof circumferentially clutch or grip the collar 248.

The leg 252 of the carrier 250 is provided with a stud 263 having a shank 264 which is pressed into the leg but does not extend therethrough. The stud 263 is substantially diametrically opposed to the stud 261 at substantially the same radius. Each of the studs 261 and 263 are provided with pins 266 and 267, respectively, which are similar in size and contour and extend laterally from their respective legs for operative engagement with the pawl 245. The pins may be round or flat-sided as desired, but are illustrated square in cross section to provide at least one flat surface the advantages of which will hereinafter become apparent.

Referring now to Fig. 27, which is illustrative of the operative association of the pawl 45 and the pin carrier 250, the arrangement may properly be termed as a non-continuous, intermittent escapement whereby the pivotal movement of the pawl as determined by the lever 240 permits rotation of the pin carrier through predetermined angles. The pawl 245 at its pre-extremity is fabricated to form two tongues or latch members 270 and 271 that extend substantially laterally of the pawl body, i. e., upwardly from the plane of Fig. 27, the latch 270 having an effective radius from the shaft 238 greater than the effective radius of the latch 271 to provide a space between the latches to permit either of the pins 266 or 267 to pass therebetween.

Referring to Fig. 25, the two symmetrical cam surfaces of the cam 255 are observed to be operable with a cam follower 275 that is pivotally supported by the case of a signalling device 276 that may be of any suitable structure, i. e., an electric switch or an air valve. The follower is positioned so that a nose 277 integral therewith is in operative juxtaposition with an actuating stem 278 of the signalling device 276. Thus as the cam is rotated, the signalling device will be actuated by the cam follower throughout a time interval that is a function of the speed of rotation of the cam and the angular span of the raised cam surface.

In operation the actuator 231 receives its energy from the drum 246 that rotates continuously at a speed determined by the velocity of the belt 232. Rotatable with the drum is the shaft 239 and the annular collar 248, all of the other components remaining static in the absence of actuation by a pan to be sprayed. In the static condition, therefore, the collar 248 is rotating within the coils of the spring 258 as best seen in Fig. 26, the spring being maintained in a fixed position as hereinafter will be explained.

When the pan 234 is conveyed toward the spraying station, the lever 240 is depressed by engagement of the roller 241 with the pan causing the pawl 245 to rotate in a direction indicated by the arrow (see Fig. 27) to effect a release of the pin 266 from engagement with the tongue 270. The flat side of the stud in its disengagement from the tongue permits the release to be marked and positive. The pin carrier 250 being free from restraint has a tendency to rotate in the same direction as the shaft 239 (see Fig. 26) due to the frictional adhesion between the shaft and the sleeve bearing 254. However, the spring 258 provides the driving moment for when unrestrained the coils thereof grip or clutch the continuously rotating collar 248, and the extremity of the spring in contact with the shank 260 of the stud 261 forcibly rotates the pin carrier 250. The other extremity of the spring 248 being connected to the cam 255 by means of the aperture 259 also causes the cam to rotate in unison with the shaft 239.

Referring now to Fig. 25, the raised surface of the cam 250 when rotating as described and in a direction indicated by the arrow engages with the cam follower 275 to cause the nose 277 thereof to depress the stem 278 of the signalling device 276, thereby providing an actuating signal for operation of the spraying device. The cam 255, the spring 258 and the pin carrier 250 continue to rotate to an angular position slightly less than 180° displaced from the original restrained position wherein the tongue 271 of the pawl 245 intercepts the pin 267. The tongue 271 had previously assumed a position in the path of the pin due to the depression of the lever 240 by the pan 234 and maintains this position until the pan releases the lever after traversal thereover. The pin carrier is accordingly pivotally restrained from further rotation. The spring 258 which was in clutch or grip relation with the collar 248 is also restrained due to engagement with the shank 260 of the stud 261 and permits the collar to rotate freely. The clutch release may be readily understood by recognizing the direction which the coils of the spring 258 are wound about the collar 248 whereby a restraining force on the extremity adjacent the pin carrier 250 tends to unwind the spring. The fixed frictional engagement between the coils of the spring and the collar during unitary movement is relieved due to the rotation of the collar, the frictional tangential force component applied by the collar and as received by the coils tending to unwind the spring. Thus the pin carrier 250, the spring 258 and the pan 255 are limited to a rotation of slightly less than 180° for traversal of one pan and provides one actuating signal therefor.

When the pan 234 releases the lever 240 the pawl 245 under spring loading returns to the initial position, and for the sequence just described the pin 267 is released from the pawl tongue 271 and is restrained at a position substantially 180° from the original position by the pawl tongue 270. For the next subsequent pan to be sprayed the operation is the same, the pin carrier 250 and the associated components having a new starting position 180° from that as illustrated in the drawings.

For convenience, the actuating unit as illustrated is drawn to a dual pin and dual cam surface embodiment, whereby 180° is necessary for each actuating signal. However, it is contemplated that a single or multiple pin arrangement with corresponding cam may be designed to accommodate various requirements and operates substantially as herein described. Further, the angle included by the raised cam surface may be larger or smaller as desired to satisfy the calculated time interval prior to the initiating of an actuating signal, the time during which the signal is impressed and the subsequent interruption thereof.

The signalling device 276 as shown in Fig. 25, as hereinbefore indicated, may take exemplary forms of an air valve or an electric switch. The use of the former in conjunction with the actuator unit 231 as integrated with the entire apparatus is readily illustrated by reference to Fig. 6 wherein the air valve 57 and actuator unit 55 thereby may be replaced by the signalling device 276 and the actuator unit 231 of Figs. 24 and 25. The use of an electric switch may be illustrated by reference to Fig. 23 wherein the switches 211 and 212 thereof may be eliminated and substituted by the signalling device (electric switch) 276 of Fig. 25 to operate the apparatus as shown in Fig. 23 as previously described to operate the solenoid 209.

Thus there is provided the single-lever actuator incorporating time-delay characteristics to accommodate the rapid traversal of pans to be sprayed, and developing a predetermined actuating movement or signal that may be used to operate any suitable response means, such as the electrical or pneumatic systems as described.

While the invention that has been illustrated and described as embodied in several embodiments, the construction is, of course, subject to other modifications without departing from the spirit and scope of the invention. It is, therefore, not desired to restrict the invention to the particular form of construction illustrated and described, but to cover all modifications that fall within the scope of the appended claims.

I claim as my invention:

1. A spraying apparatus for spraying grease upon the inner surfaces of the side and end walls of baking pans, comprising: a substantially horizontal conveyor for transporting said baking pans, a container for grease; a vertically movable frame; a spray nozzle carried by said frame and disposed above said conveyor; actuating means responsive to movement of a pan to a position under said nozzle to move said frame downwardly so as to cause said nozzle carried by said frame to enter said pan; a hydraulic line extending from said container to a point adjacent said nozzle; a fluid passage extending from said line to said nozzle; a normally closed nozzle valve disposed in said passage; control means responsive to the entrance of said nozzle into said pan to open said nozzle valve; grease displacing means having a limited displacement for forcing a metered amount of the grease through said line and said passage when said nozzle valve is open; means responsive to further movement of the pan to a predetermined position to inactivate said actuating means; and spring means responsive to inactivation of said actuating means for elevating said frame so as to withdraw said nozzle from said pan.

2. In an apparatus for applying grease to a bread pan, the combination of: supporting structure providing a spraying station for bread pans; a grease distributor; a sump pump means for taking grease from the sump and circulating it through the grease distributor and back to the sump; a valve closing a passage through which grease may be delivered to the pan from said distributor, said valve being spring loaded to keep said passage closed during the circulation of the grease to and from said sump; and means governed by the presence of a bread pan in said spraying station for increasing the pressure of grease in the distributor to a degree sufficient to open said valve and allow grease to flow to said pan and close said valve whenever a measured quantity of grease has been so delivered.

3. A spraying apparatus for spraying liquid on an object, comprising: a conveyor along which the object can move; a container for liquid; a frame movable toward and away from said conveyor; a pneumatic actuator cylinder adapted to be connected to a source of compressed air and operatively connected to said frame for moving the same; a valve means for controlling the introduction of air into said actuator cylinder; a valve actuating means comprising at least one lever disposed within the path of movement of the object so as to be moved by the object upon arrival thereof at a predetermined position on said support, and operatively connected to said valve means to effect opening of said valve means to cause movement of said frame toward the object, and including delay means to maintain said valve means open for a predetermined time interval commensurate with the velocity of said object along said support and thereafter effect a closing of said valve means; spring means operative to move said frame away from said support upon closing of said valve means; a spray nozzle carried by said frame; and hydraulic metering valve means in communication with said container and said nozzle and responsive to movement of said frame toward said support to force a predetermined quantity of the liquid through said nozzle.

4. An apparatus as defined in claim 3 in which said delay means includes: a cam having at least one raised portion and adapted to be intermittently displaced upon movement of said lever; a switch for operative engagement with said cam; and a solenoid in circuit relation with said switch and operable to open said valve means in accordance with traversal of said cam raised portion engaging with said switch throughout said predetermined time interval.

5. In a spraying apparatus for spraying liquid on an object, the combination of: supporting structure providing a spraying station; conveyor means carried by said supporting structure and movable through said spraying station for moving the object through said spraying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station, said frame being fixed against movement in a direction parallel to said conveyor means; actuating means connected to said frame for moving said spray unit between said extended and retracted positions; a container for liquid; discharge means communicating with said container and said spray unit for discharging liquid through said nozzle; first control means carried by said supporting structure for energizing said actuating means; and second control means carried by said frame for energizing said discharge means.

6. An apparatus as defined in claim 5 in which said nozzle is pivotally mounted on said frame for pivotal movement on a substantially horizontal axis.

7. An apparatus as defined in claim 6 and including yieldable centering means for normally maintaining said nozzle in a substantially vertical position.

8. In a spraying apparatus for spraying liquid on an object, the combination of: supporting structure providing a spraying station; conveyor means carried by said supporting structure and movable through said spraying station for moving the object through said spraying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station, said frame being fixed against movement in a direction parallel to said conveyor means; actuating means connected to said frame for moving said spray unit between said extended and retracted positions; a container for liquid; discharge means communicating with said container and said spray unit for discharging liquid through said nozzle; first control means carried by said supporting structure and responsive to movement of the object into said spraying station for energizing said actuating means; and second control means carried by said frame and responsive to movement of said spray unit into said extended position and to the presence of the object in said spraying station for energizing said discharge means.

9. In a spraying apparatus for spraying liquid on an object, the combination of: supporting structure providing a spraying station; conveyor means carried by said supporting structure and movable through said spraying station for moving the object through said spraying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station; actuating means connected to said frame for moving said spray unit between said extended and retracted positions; a container for liquid; discharge means communicating with said container and said spray unit for discharging liquid through said nozzle; first control means carried by said supporting structure and responsive to the object upon movement thereof into said spraying station for energizing said actuating means; and second control means carried by said frame and responsive to movement of said spray unit into said extended position and to the presence of the object in said spraying station for energizing said discharge means, said second control means including liquid displacing means carried by said frame and engageable with said supporting structure upon movement of said spray unit into said extended position to energize said discharge means.

10. In a spraying apparatus for spraying liquid on an object, the combination of: supporting structure providing a spraying station; conveyor means carried by said supporting structure and movable through said spraying station for moving the object through said spraying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station; an actuating cylinder operatively connected to said frame and operable by an operating fluid under pressure for moving said spray unit between said extended and retracted positions; valve means operatively connected to said actuating cylinder for controlling the delivery of operating fluid thereto; first control means carried by said supporting structure and responsive to the object upon movement thereof into said spraying station for opening said valve means, said first control means including a lever operatively connected to said valve means and carried by said supporting structure in the path of the object being moved into said spraying station by said conveyor means; a container for liquid; discharge means communicating with said container and said spray unit for discharging liquid through said nozzle; and second control means carried by said frame and responsive to movement of said frame to a position bringing said spray unit into said extended position and to the presence of the object in said spraying station for energizing said discharge means.

11. An apparatus as defined in claim 10 in which said first control means also includes: a plunger engageable with a movable element of said valve means; and a triggered latch trip device interposed between and operatively connected to said lever and said plunger to effect a snap action of said movable valve element for rapidly acceleraitng movement of said spray unit to and from said extended position.

12. An apparatus as defined in claim 10 in which said first control means also includes: a plunger engageable with a movable element of said valve means; a latch trip device interposed between and operatively connected to said lever and said plunger; spring means for actuating said latch trip device; and releasable means for normally withholding said latch trip device from actuation by said spring means, said releasable means being operatively connected to said lever and adapted to be released thereby in response to movement imparted thereto by the object.

13. An apparatus as defined in claim 10 in which said first control means includes: a first movable lever disposed within the path of movement of the object; a first latch trip device operatively connected to said valve means; a second movable lever also disposed within the path of movement of the object; and a second latch trip device for actuating said first latch trip device to actuate said valve means, said first and second levers being so spaced longitudinally of the path of movement of the object that the object first engages and moves said first lever and thereafter engages and moves said second lever.

14. An apparatus as defined in claim 10 in which said first control means includes: a first pivot shaft; a second pivot saft; a first lever fixed to said first shaft and having an end disposed within the path of movement of the object; a second lever pivoted on said second shaft and having an end disposed within the path of movement of the object, said levers being so located that said first lever is first engaged and pivoted by the object and said second lever is subsequently engaged and pivoted by the object prior to release of said first lever by the object, said first lever being released prior to release of said second lever; a first arm pivoted on said first shaft and adapted when pivoted in one direction to open said valve means; a second arm fast on said second shaft; a first toggle device having a pair of pivotally connected elements disposed between said first and second arms; a first spring engaging one of said elements and operative to align said elements so as to provide a driving connection between said second and first arms; a crank fixed to said first shaft and normally engaging one of said toggle elements to break the driving connection, said crank being pivoted with said first shaft when said first lever is initially engaged by the object; a finger pivoted on said second shaft and operatively connected to said second lever; a third arm fixed to said second shaft; a fixed bracket; a second toggle device having a pair of pivotally connected elements disposed between said third arm and said bracket; and a second spring connected to one of the elements of said second toggle device and normally operative to align said second toggle, one of said elements being engageable by said finger when the same is pivoted by said second lever so as to break said second toggle device and thereby permit pivotal movement of said second shaft, said second shaft being adapted to transmit pivotal movement to said first arm through the medium of said second arm and said first toggle device so as to rapidly open said valve means, pivotal movement of said first lever when released by the object acting to break said first toggle device so as to cause pivotal movement of said first arm in a direction to effect rapid opening of said valve means.

15. An apparatus as defined in claim 14 which includes: a sleeve member pivoted on said second pivot shaft and having a radially projecting bar; and a resilient connection between said bar and said second lever, said finger being integral with said sleeve.

16. An apparatus as defined in claim 15 which includes an abutment screw adjustably mounted on said finger and engageable with an appendage on one of said elements of said second toggle device.

17. An apparatus as defined in claim 16 in which the other of said elements of said second toggle device has a stop engageable with said bracket to limit relative pivotal movement of said elements of said second toggle device in one direction to maintain the same in alignment.

18. An apparatus as defined in claim 17 in which one of said toggle elements of said first toggle device has an appendage which is engageable with a stud on said crank.

19. An apparatus as defined in claim 18 in which one of said toggle elements of said first toggle device has a stop engageable with said second arm to limit relative pivotal movement of said elements of said first toggle device in one direction to maintain the same in alignment.

20. In a spraying apparatus for spraying liquid on an object, the combination of: supporting structure providing a spraying station; conveyor means carried by said supporting structure and movable through said spraying station for moving the object through said spraying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station; actuating means connected to said frame for moving said spray unit between said extended and retracted positions; a container for liquid; discharge means communicating with said container and said spray unit for discharging liquid through said nozzle, said discharge means including liquid displacing means having a limited stroke for discharging a metered amount of liquid through said nozzle; first control means responsive to the object upon movement thereof into said spraying station for energizing said actuating means; and second control means responsive to movement of said spray unit into said extended position and to the presence of the object in said spraying station for energizing said discharge means.

21. In a spraying apparatus for spraying liquid on an object, the combination of: supporting structure providing a spraying station; conveyor means carried by said supporting structure and movable through said spraying station for moving the object through said spaying station; a frame carried by said supporting structure adjacent said spraying station and carrying a spray unit having a nozzle, said frame being movable relative to said supporting structure in a direction transversely of said conveyor means to move said spray unit between an extended position in said spraying station and a retracted position spaced from said spraying station; actuating means connected to said frame for moving said spray unit between said extended and retracted positions; a container for liquid; means for circulating liquid from said container through said spray unit and back to said container; valve means associated with said circulating means and actuable to interrupt circulation of liquid through said spray unit; discharge means communicating with said spray unit for discharging liquid through said nozzle, said discharge means including liquid displacing means having a limited stroke for discharging a metered amount of liquid through said nozzle; first control means carried by said supporting structure and responsive to movement of the object into said spraying station for energizing said actuating means; and second control means carried by said frame and responsive to movement of said spray unit into said extended position and to the presence of the object in said spraying station for actuating said valve means and energizing said discharge means so as to interrupt circulation of liquid through said spray unit and to discharge a metered amount of liquid through said nozzle, said second control means being operatively connected to said valve means and said discharge means.

22. An apparatus according to claim 21 wherein said first control means includes a lever carried by said supporting structure in said spraying station and disposed in the path of the object being moved by said conveyor means so as to be engageable by the object upon movement thereof into said spraying station.

23. An apparatus as defined in claim 22 wherein said second control means includes plunger means carried by said frame and engageable with said supporting structure upon movement of said spray unit into said extended position for actuating said liquid displacing means, said plunger means being operatively connected to said displacing means.

24. An apparatus as defined in claim 23 in which said second control means includes an element carried by said frame and operatively connected to said valve means, said element being adapted to engage the object and to be moved thereby to actuate said valve means in response to movement of said spray unit into said extended position.

25. In a spraying apparatus, the combination of: supporting structure; a frame carried by said supporting structure and carrying a spray unit, said frame being movable relative to said supporting structure to move said spray unit between extended and retracted positions; fluid displacing means communicating with said spray unit and having a limited displacement for delivering a metered amount of fluid to said spray unit; plunger means carried by said frame and engageable with said supporting structure upon movement of said spray unit into its extended position for applying fluid pressure to said fluid displacing means to displace it so as to cause said fluid displacing means to deliver a metered amount of fluid to said spray unit, said plunger means communicating through a passage with one side of said fluid displacing means; a bypass valve communicating with said passage; and means carried by said frame and engageable with an object to be sprayed when said spray unit is in its extended position for holding said bypass valve open, the means last defined including a movable element which normally engages said bypass valve to hold it open but which is moved out of engagement with said bypass valve to permit it to close when the means last defined engages the object.

26. An apparatus according to claim 25 wherein the means last defined includes another element connected to the element defined in claim 25 and adapted to engage the object when said spray unit is in said extended position to move the first-defined element out of engagement with said bypass valve.

27. In a spraying apparatus for spraying liquid on an object, the combination of supporting structure providing a spraying station for objects to be sprayed; a spray unit having a nozzle, said spray unit being movable relative to said supporting structure to move said nozzle between an extended position in said spraying station and a retracted position spaced from said spraying station; a container for liquid; circulating means including a pump for circulating liquid from said container through said spray unit and back to the container; a valve closing a passage through which liquid may be delivered to the object from said nozzle, said valve being spring loaded to keep said passage closed during the circulation of the liquid to and from said container; and means in said circulating system responsive to movement of said spray unit into its extended position for increasing the pressure of the liquid in the nozzle passage to a degree sufficient to open said valve for emission of liquid under pressure from said nozzle to said object.

28. In a spraying apparatus for spraying liquid on an object, the combination of: supporting structure providing a spraying station, conveyor means carried by said supporting structure and movable through said spraying station for moving the object through said spraying station, a frame carried by said supporting structure adjacent said spraying station and carrying a spray unit having a nozzle, said spray unit and nozzle being movable between an operative position and in inoperative position relative to said supporting structure and in a direction transversely of said conveyor means, said frame being fixed against movement in a direction parallel to said conveyor means, a container for liquid, discharge means communicating with said container and said spray unit for discharging liquid through said nozzle, actuating means carried by said supporting structure and connected to said spray unit to effect the movement of said spray unit between its operative and inoperative positions, said actuating means being energized by the object moving into said spraying station on said conveyor means, and a control means responsive to said object in said spraying station for energizing said discharge means.

References Cited in the file of this patent

UNITED STATES PATENTS

| | | |
|---|---|---|
| 1,549,999 | Moller | Aug. 18, 1925 |
| 1,724,643 | Debus | Aug. 13, 1929 |
| 1,850,837 | Hatch | Mar. 22, 1932 |
| 1,862,380 | Larson | June 7, 1932 |
| 2,062,900 | Nagy | Dec. 1, 1936 |
| 2,332,385 | Lauring | Oct. 19, 1943 |
| 2,333,557 | Fischer | Nov. 2, 1943 |
| 2,350,708 | Roselund | June 6, 1944 |
| 2,383,023 | Sykes et al. | Aug. 21, 1945 |
| 2,415,194 | Roselund | Feb. 4, 1947 |
| 2,461,766 | Peeps | Feb. 15, 1949 |